United States Patent
Yago

(10) Patent No.: US 7,660,014 B2
(45) Date of Patent: Feb. 9, 2010

(54) IMAGE PROCESSING APPARATUS CAPABLE OF EXTRACTING RULE FROM DOCUMENT IMAGE WITH HIGH PRECISION

(75) Inventor: Kazuya Yago, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 775 days.

(21) Appl. No.: 11/447,050

(22) Filed: Jun. 6, 2006

(65) Prior Publication Data

US 2007/0165280 A1 Jul. 19, 2007

(30) Foreign Application Priority Data

Jan. 17, 2006 (JP) .............................. 2006-009115

(51) Int. Cl.
*G06F 15/00* (2006.01)
*G06K 1/00* (2006.01)
*H04N 1/60* (2006.01)
*G06K 15/00* (2006.01)
*H04N 1/40* (2006.01)

(52) U.S. Cl. ...................................... 358/1.9; 358/3.23

(58) Field of Classification Search .................. 358/1.9, 358/1.2, 2.1, 3.09, 3.1, 3.23, 3.24, 505, 474
See application file for complete search history.

(56) References Cited

U.S. PATENT DOCUMENTS

| | | | |
|---|---|---|---|
| 4,503,556 A | 3/1985 | Scherl et al. | |
| 5,687,252 A | 11/1997 | Kanno et al. | |
| 5,867,159 A | 2/1999 | Hamada et al. | |
| 6,226,402 B1 | 5/2001 | Katsuyama | |
| 6,628,832 B2 | 9/2003 | Kanatsu | |
| 6,628,833 B1 | 9/2003 | Horie | |
| 6,721,071 B1 | 4/2004 | Maruyama | |
| 6,785,420 B2 | 8/2004 | Yamaai | |
| 6,798,906 B1 | 9/2004 | Kato | |
| 6,885,768 B2 | 4/2005 | Fujiwara | |
| 6,937,762 B2 | 8/2005 | Fujiwara | |
| 6,963,417 B1 | 11/2005 | Saito | |

(Continued)

FOREIGN PATENT DOCUMENTS

JP      1-266689       10/1989

(Continued)

OTHER PUBLICATIONS

Japanese Notice of Grounds of Rejection, mailed Feb. 24, 2009, directed to counterpart Japanese Patent Application No. 2006-009115; 8 pages.

(Continued)

*Primary Examiner*—Douglas Q Tran
(74) *Attorney, Agent, or Firm*—Morrison & Foerster LLP

(57) ABSTRACT

An image processing apparatus scans image data along a row in an x direction, and if a series of black pixels having a length equal to or more than a first threshold is detected, the series of black pixels is determined as a rule and erased. Furthermore, if a series of black pixels having a length equal to or more than a second threshold that is connected to the rule and extends in a y direction is detected, the series of black pixels is determined as a rule and erased.

20 Claims, 15 Drawing Sheets

U.S. PATENT DOCUMENTS

| | | |
|---|---|---|
| 2002/0003897 A1 | 1/2002 | Tanaka |
| 2003/0118234 A1 | 6/2003 | Tanaka et al. |
| 2004/0208368 A1 | 10/2004 | Yoshida |
| 2005/0175239 A1* | 8/2005 | Araki et al. |
| 2007/0172137 A1 | 7/2007 | Mori |

FOREIGN PATENT DOCUMENTS

| | | |
|---|---|---|
| JP | 3-41562 | 2/1991 |
| JP | 3-172984 | 7/1991 |
| JP | 4-158482 | 6/1992 |
| JP | 5-282493 | 10/1993 |
| JP | 6-76103 | 3/1994 |
| JP | 06-187489 A | 7/1994 |
| JP | 6-348891 | 12/1994 |
| JP | 7-168911 | 7/1995 |
| JP | 08-317197 A | 11/1996 |
| JP | 9-223240 | 8/1997 |
| JP | 10-049688 A | 2/1998 |
| JP | 10-187878 | 7/1998 |
| JP | 2000-222577 | 8/2000 |
| JP | 2000-306102 | 11/2000 |
| JP | 2001-34763 | 2/2001 |
| JP | 2001-60247 | 3/2001 |
| JP | 2001-147988 A | 5/2001 |
| JP | 2001-266068 | 9/2001 |
| JP | 2002-165105 | 6/2002 |
| JP | 2003-069843 A | 3/2003 |
| JP | 2003-189096 A | 7/2003 |
| JP | 2003-317107 A | 11/2003 |
| JP | 2004-246929 | 9/2004 |
| JP | 2004-304469 A | 10/2004 |
| JP | 2005-316813 A | 11/2005 |

OTHER PUBLICATIONS

Japanese Office Action mailed on Feb. 24, 2009 directed at related application No. 2006-013830; 8 pages.

Wong, K. Y. et al. (Nov. 1982)."Document Analysis System" *IBM J. Res. Develop.* 26(6):647-656.

Mori, T., U.S. Office Action, mailed May 26, 2009, directed to a related U.S. Appl. No. 11/447,103; 16 pages.

Japanese Decision to Grant Patent, mailed May 26, 2009, directed to counterpart Japanese Patent Application No. 2006-009115; 6 pages.

Japanese Office Action mailed on May 19, 2009 directed at application No. 2006-013830; 8 pages.

Japanese Notice of Grounds of Rejection, mailed Sep. 1, 2009, directed to Japanese Patent Application No. 013830/2006; 5 pages.

* cited by examiner

IMAGE PROCESSING APPARATUS CAPABLE OF EXTRACTING RULE FROM DOCUMENT IMAGE WITH HIGH PRECISION

This application is based on Japanese Patent Application No. 2006-009115 filed with the Japan Patent Office on Jan. 17, 2006, the entire content of which is hereby incorporated by reference.

BACKGROUND OF THE INVENTION

1. Field of the Invention

The present invention relates to an image processing apparatus and a rule extracting program product. In particular, it relates to an image processing apparatus and a rule extracting program product that discriminate a rule part in a document.

2. Description of the Related Art

With the recent advance of computerization of information, there is a growing demand for archive or transmission of documentation in an electronic form rather than in a paper form. Thus, an increasing number of image processing apparatus that obtain image data, such as multi function peripherals (MFP), are provided with a function of transmitting image data obtained by scanning as an attachment to an e-mail without printing out the image on a sheet of paper.

The images handled by the image processing apparatus, such as MFP, are now shifting from monochrome images to color images, so that the image data described above are now color image data in many cases. If an MFP scans and captures an A4-sized (297 mm by 210 mm) full-color document with a resolution of 300 dpi, the size of the color image data reaches about 25 MB. Thus, there is a problem that the color image data is too large to transmit as an attachment to an e-mail.

In order to solve the problem, typically, the image data captured by scanning (abbreviated as scan data, hereinafter) is reduced in size by compression for transmission. However, if the scan data is compressed with a uniform resolution for the whole image, the readability of characters in the image is compromised. Meanwhile, if the scan data is compressed with a high resolution enough to assure the readability of characters in the image, the size of the scan data cannot be reduced satisfactorily.

In order to solve the problem, there has been proposed a file creation method, such as a so-called compact PDF (portable document format) formatting, which compresses scan data with different resolutions for different areas in the image. In the compact PDF formatting, a PDF file is created as follows:

(1) A process of discriminating between areas in scan data is performed to separate a character part and a non-character part;

(2) Binarization is performed on the character part with a high resolution, and areas of characters which have the same color attribute are integrated on the same layer and reversibly compressed by modified modified-read (MMR) compression or the like;

(3) The non-character part is irreversibly compressed by joint photographic experts group (JPEG) compression or the like with a reduced resolution; and (4) The PDF file is created from the each compressed data.

This method of compressing scan data can assure both the readability of characters and the size reduction.

In this method, which is performed as described above, it is important to accurately extract the character part from the scan data. To this end, it is important to accurately extract rules from the character area containing both characters and rules.

Specifically, for example, concerning character discrimination performed on a document image containing a set of characters "ABC" and a set of characters "123" placed between rules and a set of characters "abc" placed on a rule shown in FIG. 18, the difference of the discrimination result between a case where rule extraction is performed and a case where rule extraction is not performed will be described.

In the case where character discrimination that does not involve rule extraction is performed on the document image shown in FIG. 18, as shown in FIG. 19, the set of characters "abc" placed on a rule is not recognized as characters, because the characters and the rule are recognized as one image. As a result, when the document image is compressed, the set of characters "abc" is compressed with a reduced resolution, so that the readability of the characters is compromised.

On the other hand, in the case where character discrimination that involves rule extraction is performed on the document image shown in FIG. 18, rules in the document image are extracted and removed as shown in FIG. 20, so that all the characters in the document image are recognized as characters as shown in FIG. 21. As a result, when the document image is compressed, the characters are compressed with a high resolution, so that the readability of the characters is not compromised.

As such a rule extraction, in Japanese Laid-Open Patent Publication No. 10-187878 (referred to as Patent Document 1, hereinafter), for example, there is proposed a table processing method that recognizes frames in a table image. In addition, in Japanese Laid-Open Patent Publication No. 2000-222577 (referred to as Patent Document 2, hereinafter), there is proposed a rule processing method that extracts a black run having a length in the main scanning direction or sub-scanning direction equal to or more than a predetermined threshold as a rule and determines a set of rules extracted in a predetermined area as a character if the number of the rules is equal to or more than a prescribed number. In addition, in Japanese Laid-Open Patent Publication No. 2000-306102 (referred to as Patent Document 3, hereinafter), there is proposed a rule extraction method of extracting runs from an input image, extracting connected rectangles from the extracted runs, extracting a connected rectangle having a length equal to or more than a predetermined threshold from the extracted connected rectangles, and extracting a short rule by further extracting a connected rectangle from the remaining image.

However, if the method described in the Patent Document 1 is used to extract a rule in a document image, there is a problem that rules other than those forming a frame are not extracted, although rules forming a frame are extracted. On the other hand, the methods described in the Patent Documents 2 and 3 have a problem that rule extraction takes a long time because it involves extracting a line having a length equal to or more than a predetermined threshold as a rule or extracting a connected rectangle before extracting a rule.

Furthermore, these methods have a problem that any oblique line is not extracted, although frame lines and rules extending in the main scanning direction or sub-scanning direction are extracted.

SUMMARY OF THE INVENTION

The present invention has been devised in view of such problems, and an object of the present invention is to provide an image processing apparatus and a rule extracting program product that can extract a rule from a document image with high precision while assuring high processing speed.

In order to attain the object described above, according to an aspect of the present invention, there is provided an image processing apparatus, comprising: an image data obtaining unit for obtaining image data; and a rule extracting unit for extracting a rule from the image data, in which the rule extracting unit includes: a first determining unit for scanning the image data in a first direction and, if a first series of pixels having a length equal to or more than a first threshold is detected, determining the first series of pixels as a first rule; and a second determining unit for scanning the image data from the first rule in a second direction and, if a second series of pixels having a length equal to or more than a second threshold connected to the first rule is detected, determining the second series of pixels as a second rule, and the second threshold is smaller than the first threshold.

According to another aspect of the present invention, there is provided an image processing apparatus, comprising: an image data obtaining unit for obtaining image data, and a rule extracting unit for extracting a rule from the image data, in which the rule extracting unit includes: a first determining unit for scanning the image data in a first direction and, if a first series of pixels having a length equal to or more than a first threshold is detected, determining the first series of pixels as a first rule; and a second determining unit for scanning the image data in a second direction which is at an angle equal to or more than 0 degrees and less than 90 degrees with respect to the first direction and, if a second series of pixels having a length equal to or more than a second threshold connected to the first rule is detected, determining the second series of pixels as a second rule.

Configured as described above, the image processing apparatus according to the present invention can accurately extract a rule from a document image while maintaining high processing speed.

According to another aspect of the present invention, a rule extraction program causes a computer to perform rule extraction processing in an image processing apparatus, the rule extraction processing comprising: an image data obtaining step of obtaining image data; a first extraction step of scanning the image data in a first direction and, if a first series of pixels having a length equal to or more than a first threshold is detected, determining the first series of pixels as a first rule and extracting the first series of pixels; and a second extraction step of scanning the image data from the first rule in a second direction and, if a second series of pixels having a length equal to or more than a second threshold connected to the first rule is detected, determining the second series of pixels as a second rule and extracting the second series of pixels, the second threshold being smaller than the first threshold.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
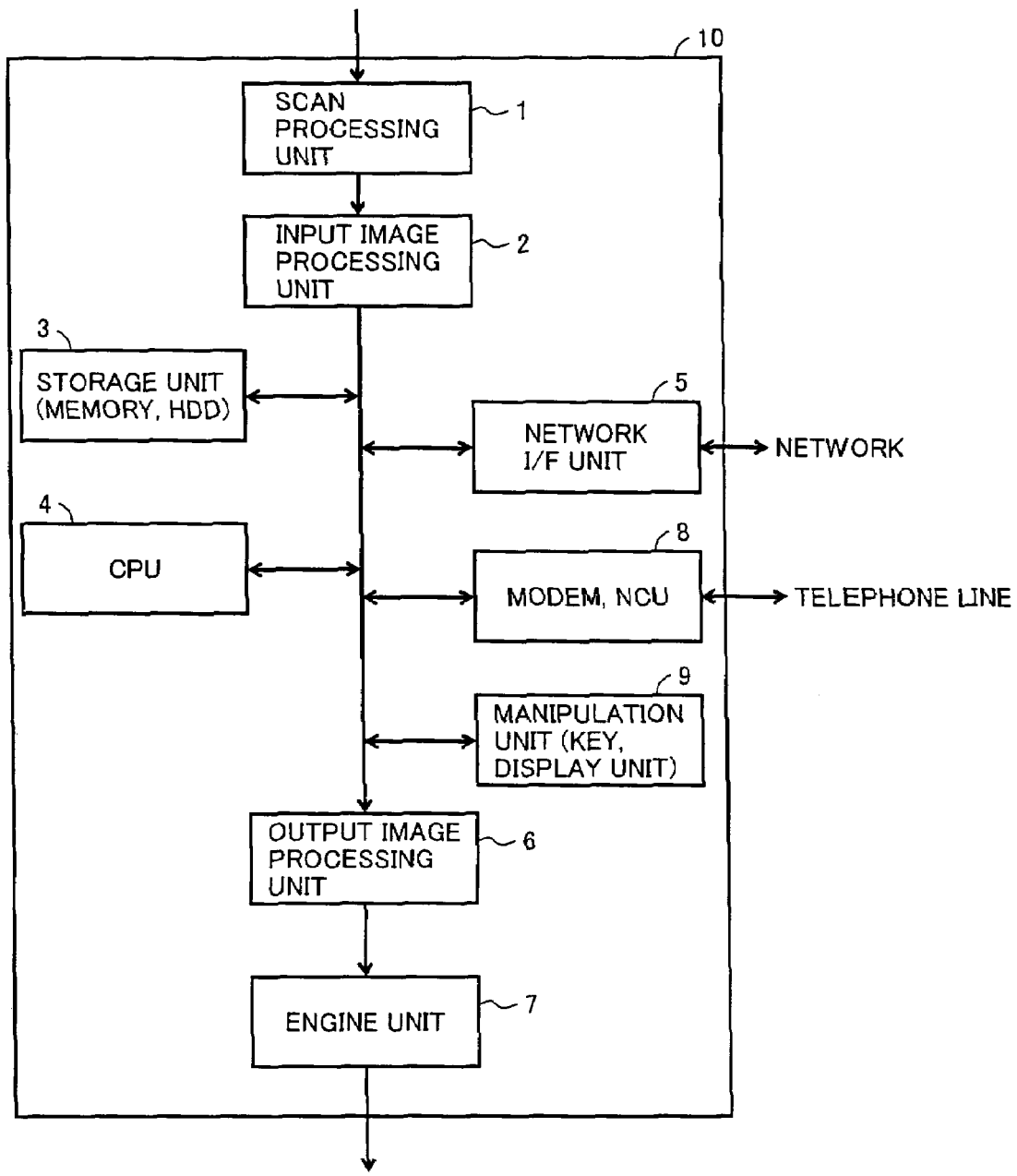
FIG. 1 is a diagram showing a specific example of a hardware configuration of an MFP 10.

In the following, an embodiment of the present invention will be described with reference to the drawings. In the following description, like components are denoted by like reference numerals and have like names and like functionalities.

This embodiment will be described supposing that an image processing apparatus according to the present invention is a multi function peripheral (MFP). However, the image processing apparatus according to the present invention is not limited to the MFP and may be any other apparatus that includes means of obtaining image data and means of processing the image data, such as an ordinary personal computer and a facsimile machine.

Referring to FIG. 1, the MFP 10 according to this embodiment includes a scan processing unit 1, an input image processing unit 2, a storage unit 3, a central processing unit (CPU) 4, a network interface (I/F) unit 5, an output image processing unit 6, an engine unit 7, a modem/network control unit (NCU) 8 and a manipulation unit 9.

The manipulation unit 9 includes a manipulation key and a display unit and serves as a user I/F, which accepts a user's manipulation, such as entry of a destination, selection of a scan condition, selection of an image file format, such as compact PDF, and start/halt of a processing. The manipulation unit 9 outputs a manipulation signal base on the manipulation to the CPU 4.

The storage unit 3 includes an electronic memory, such as a dynamic random access memory (DRAM), and a magnetic memory, such as a hard disk, and stores a program and image data. The CPU 4 executes a program stored in the storage unit 3 and outputs a required control signal to each unit based on the manipulation signal input from the manipulation unit 9, thereby controlling the entire MFP 10. The storage unit 3 is used also as a work area for the CPU 4 to execute a program.

The scan processing unit 1 scans and reads a placed document in accordance with the control signal and outputs image data to the input image processing unit 2. In accordance with the control signal, the input image processing unit 2 performs, on the input image data, a processing, such as color conversion, color correction, resolution conversion, area discrimination or the like. The data processed is stored in the storage unit 3.

The output image processing unit 6 reads out the image data from the storage unit 3 in accordance with the control signal, performs screen control, smoothing, pulse wide modulation (PWM) control or the like on the image, and outputs the processed image data to the engine unit 7.

In accordance with the control signal, the engine unit 7 generates a toner image based on the image data input from the output image processing unit 6 and prints out the image by transferring the toner image onto a placed sheet of printing paper. In the case where the MFP 10 is a color MFP for outputting color images, the engine unit 7 generates the toner image using four colors of toner, yellow, magenta, cyan and black.

The CPU 4 executes the program stored in the storage unit 3, performs an image processing on the image data stored in the storage unit 3 and sends output to the storage unit 3, the network I/F unit 5 or the modem/NCU 8.

The network I/F unit 5 is an I/F for transmitting an e-mail or the like to another device via a network and performs protocol generation or the like. The network I/F unit 5 transmits the image data input from the CPU 4 or the image data read out from the storage unit 3 to another device via a network in accordance with the control signal.

The modem/NCU 8 performs modulation or demodulation for facsimile transmission/reception, generation of a facsimile communications protocol or the like to control communications via a telephone line. The modem/NCU 8 transmits the image data input from the CPU 4 or the image data read out from the storage unit 3 to another device via a telephone line in accordance with the control signal.

Figure 2:
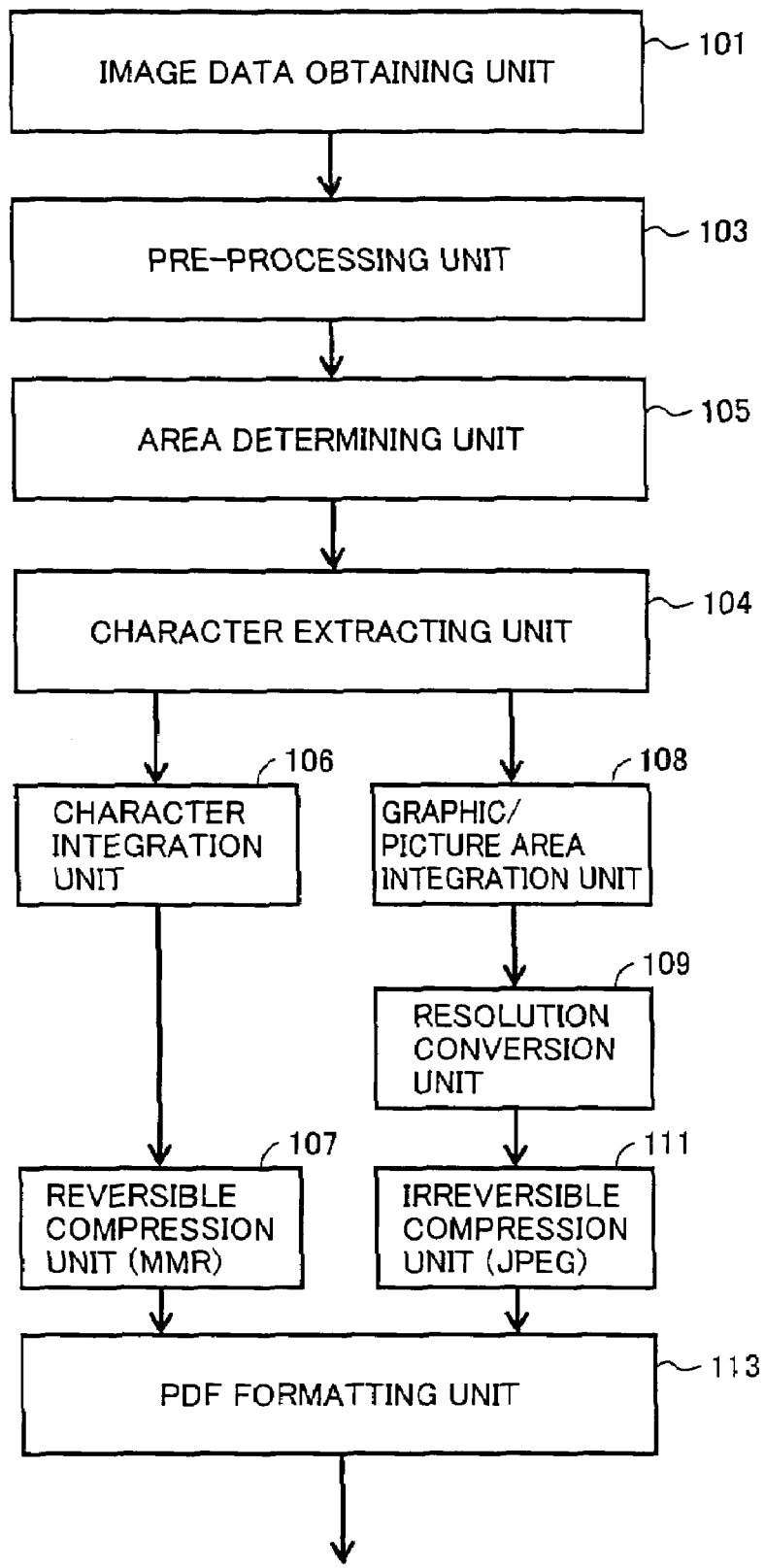
FIG. 2 is a block diagram showing a specific example of a functional configuration for creating a portable document format (PDF) file by compressing image data in the MFP 10.

Units shown in FIG. 2 are functions that are formed on the CPU 4 when the CPU 4 executes a program stored in the storage unit 3. Some of the functions may be formed on another hardware unit, such as the input image processing unit 2.

Referring to FIG. 2, in the MPF 10 according to this embodiment, a function for creating a portable document format (PDF) file includes an image data obtaining unit 101, a pre-processing unit 103, a character extracting unit 104, an area determining unit 105, a character integration unit 106, a reversible compression unit 107, a graphic/picture area integration unit 108, a resolution conversion unit 109, an irreversible compression unit 111 and a PDF formatting unit 113.

The image data obtaining unit 101 obtains image data generated in the scan processing unit 1 and inputs the image data in a data format, such as tagged image file format (TIFF), joint photographic experts group (JPEG) and bit map (BMP), to the pre-processing unit 103.

The pre-processing unit 103 performs, on the image data input from the image data obtaining unit 101, a preprocessing for area discrimination, such as image format conversion, resolution conversion and under color removal, and inputs the pre-processed data to the area determining unit 105.

The area determining unit 105 perform binarization, labeling or the like on the image data input from the pre-processing unit 103 and determines an area in which a feature, such as a graphic and a picture, is extracted as a graphic-picture area and an area in which such a feature is not extracted as a character area. Then, the area determining unit 105 inputs the determination result to the character extracting unit 104.

Based on the determination result input from the area determining unit 105, the character extracting unit 104 extracts a character part (including a character and a ruled line, or rule) from the graphic/picture area and the character area. During this process, a rule extracting processing described later is performed. In this unit, the character part is separated from the background part, such as a picture, a graphic and a graph which is not a character, and colors of the respective parts are calculated. The character part and the graphic/picture area extracted are input to the character integration unit 106 and the graphic/picture area integration unit 108, respectively.

The character integration unit 106 and the graphic/picture area integration unit 108 integrate the character part and the graphic/picture area input from the character extracting unit 104 onto a same layer, respectively. The image data constituting the integrated graphic/picture area is input to the irreversible compression unit 111 via the resolution conversion unit 109, and the image data constituting the character part is input directly to the reversible compression unit 107 without passing through the resolution conversion unit 109.

The reversible compression unit 107 performs reversible compression, such as modified modified-read (MMR) compression, on the image data constituting the character part input from the area determining unit 105. On the other hand, the irreversible compression unit 111 performs irreversible compression, such as JPEG compression, on the image data constituting the graphic/picture area reduced in resolution by the resolution conversion unit 109. The image data constituting the character part compressed by the reversible compression unit 107 and the image data constituting the graphic/picture area compressed by the irreversible compression unit 111 are input to the PDF formatting unit 113, and the PDF formatting unit 113 creates a PDF file based on the image date.

Figure 3:
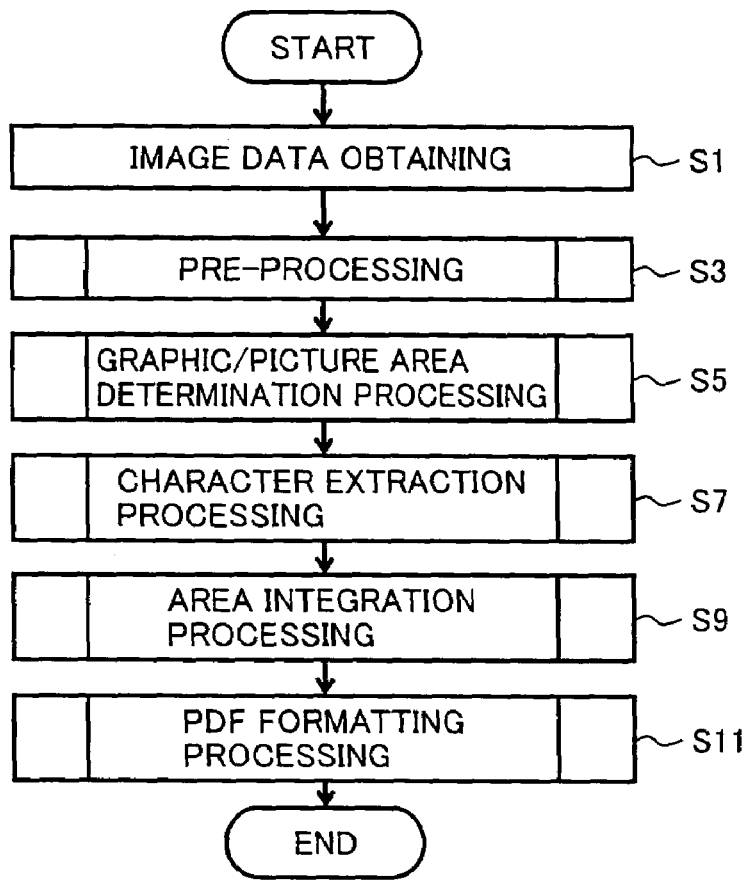
FIG. 3 is a flowchart showing a flow of a processing of creating a PDF file by compressing image data in the MFP 10.

A process shown in the flowchart in FIG. 3 is implemented primarily by the CPU 4 executing a program stored in the storage unit 3 to control the units shown in FIG. 2. Specifically, referring to FIG. 3, in the MFP 10 according to this embodiment, the image data obtaining unit 101 first obtains image data (step S1), and the pre-processing unit 103 performs a pre-processing on the obtained image data (step S3).

Figure 4:
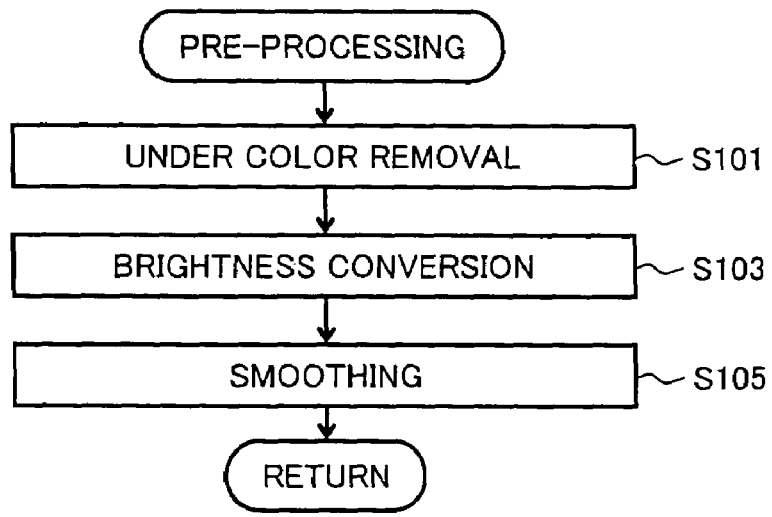
FIG. 4 is a flowchart showing a pre-processing performed in step S3.

Referring to FIG. 4, the pre-processing performed in step S3 includes under color removal processing (step S101), brightness conversion processing (step S103) and smoothing processing (step S105).

More specifically, referring to FIG. 4, in step S101, the input image data is enhanced in contrast to remove a light under color, thereby adjusting the color tendency of the input image.

Then, in step S103, the brightness of the image data with the under color removed is calculated to generate a brightness image. In the step, when the input image data is a 24-bit full-color image, a monochrome 8-bit brightness image is generated.

Then, in step S105, smoothing processing is performed on the produced brightness image. A noise is removed from the brightness image by the smoothing processing thus executed, and the precision of the following discrimination improves.

Then, the area determining unit 105 performs a discrimination processing to discriminate between a text area and a graphic/picture area (step S5).

Figure 5:
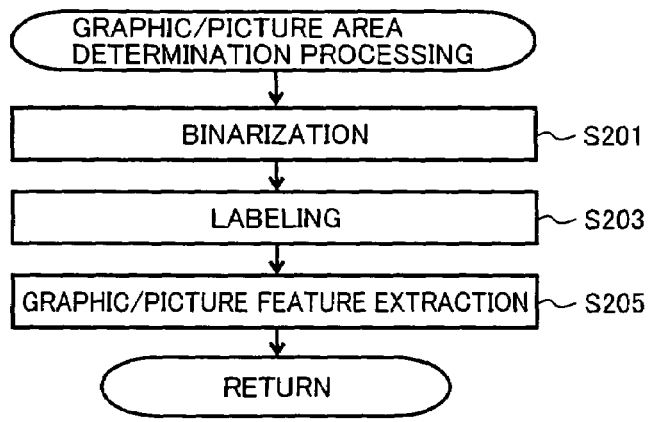
FIG. 5 is a flowchart showing a graphic/picture area discrimination processing performed in step S5.

Referring to FIG. 5, the discrimination processing of the graphic/picture area performed in step S5 includes binarization processing (step S201), labeling processing (step S203), and graphic/picture feature extraction processing (step S205).

More specifically, referring to FIG. 5, in step S201, binarization processing is performed on the pre-processed image data, thereby generating a binary image.

Then, in step S203, labeling processing is performed on the binary image, and a block, which is a small region to be detected, is detected from the image data through comparison with a prescribed threshold.

Then, in step S205, the detected block is more specifically classified according to the attribute of the image data in the block, and it is determined whether the block is a small picture region, a small graphic region, a small graph region, a small region containing a character part, these regions belong to a graphic/picture area, in a graphic/picture area, or a region containing none of such features such as a small region in a text area.

Then, the character extracting unit 104 performs a character extraction processing (step S7).

Figure 6:
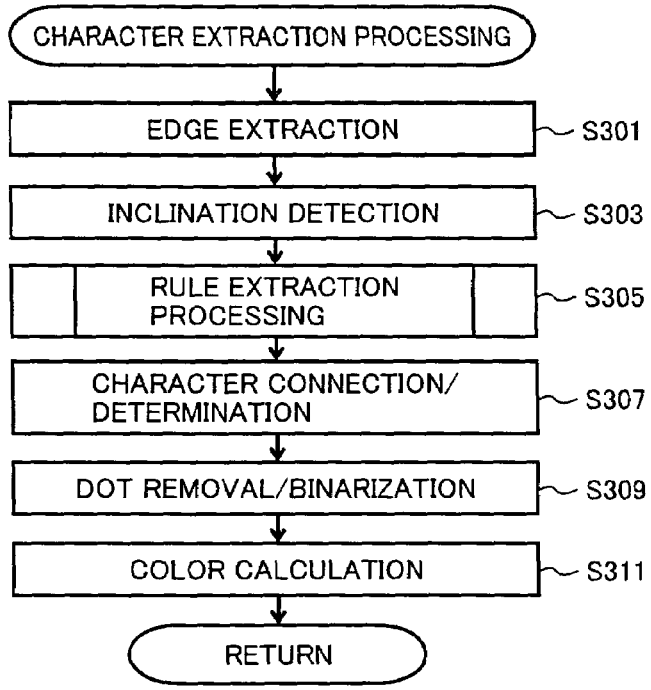
FIG. 6 is a flowchart showing a character extraction processing performed in step S7.

Referring to FIG. 6, the character extraction processing performed in step S7 includes character edge extraction processing (step S301), inclination detection processing (step S303), rule processing (step S305), character connection/determination processing (step S307), dot removal/binarization processing (step S309), and color calculation processing (step S311).

More specifically, referring to FIG. 6, in step S301, the edge is extracted from the brightness image having been subject to smoothing processing to generate an edge image. Generating the edge image in this way facilitates detection of a character or reversed character in a highly bright area.

Then, in step S303, the inclination of the edge image is detected and corrected. Correcting the inclination of the image in this way improves the precision of rule extraction.

Then, in step S305, a rule is extracted from the produced edge image and removed for character determination.

Then, in step S307, pixels of a particular color (black pixels in this example) constituting a character are expanded to connect the neighboring pixels to each other. Then, for each rectangular area of the character obtained by the pixel connection, it is determined whether or not the rectangular area is a character part based on the length of the shorter side, the ratio between the shorter side and the longer side, the proportion of the black pixels in the rectangular area or the like. This character determination processing is a common character determination processing and is not limited to a particular processing according to the present invention. Note that the character determination processing in step S307 may be performed in different ways for the area discriminated as a text area and the area discriminated as a graphic/picture area in step S5.

Then, in step S309, the processing of removal a dot from the rectangular area determined as a character part in the character determination processing in step S307 is executed. Dots are removed from the background of the character by the dot removal processing thus executed in this step, thereby preventing any dot from being binarized as a character. Furthermore, binarization processing is performed on the rectangular area, which is a character part with the dots removed, thereby separating the character and the background in the rectangular area. This binarization of the character part reduces the size of the image data.

Then, in step S311, the colors of the character and the background are determined by referring to the color data (RGB data) of the original image corresponding to the character part and the background.

Then, the character integration unit 106 and the graphic/picture area integration unit 108 integrate the characters extracted in step S7 and the graphic/picture areas determined in step S5 on the same layers, respectively (step S9).

Figure 7:
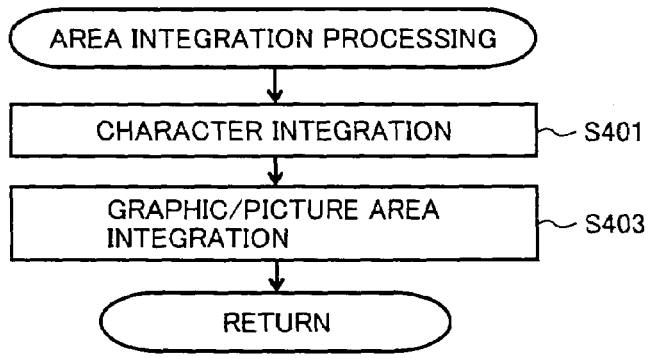
FIG. 7 is a flowchart showing an area integration processing performed in step S9.

Referring to FIG. 7, the area integration processing performed in step S9 includes character integration processing (step S401) and graphic/picture area integration processing (step S403).

More specifically, referring to FIG. 7, in step S401, if the distance between two adjacent rectangular areas that are determined as character parts in the character extraction processing in step S7 is equal to or less than a predetermined distance, and the difference between the colors allocated to the rectangular areas is equal to or less than a predetermined value, the two rectangular areas are integrated. Similarly, blocks in the graphic/picture area are also integrated if a predetermined condition is met. This integration can reduce the number of rectangular areas, which are character parts, and the number of layers to be processed contained in the graphic/picture area, so that the size of the PDF data created can be reduced. In addition, the PDF data can be created more quickly.

Then, the PDF formatting unit 113 performs PDF formatting processing on the image data obtained through the steps described above (step S11), thereby compressing the image data and creating a PDF file. Specifically, in step S11, the image data constituting the character part integrated in step S9 is subjected to reversible compression, such as MMR compression, in the reversible compression unit 107 without being reduced in resolution. On the other hand, the image data constituting the integrated graphic/picture area is subjected to resolution conversion in the resolution conversion unit 109 to reduce the resolution and then is subjected to irreversible compression, such as JPEG compression, in the irreversible compression unit 111.

Here, the PDF formatting processing in step S11 is a common processing for producing a so-called compact PDF file and is not limited to a particular processing according to the present invention.

The rule extraction processing in step S305 described above will be described below with reference to first to fourth rule extraction processings as specific examples.

[First Rule Extraction Processing]

Figure 8:
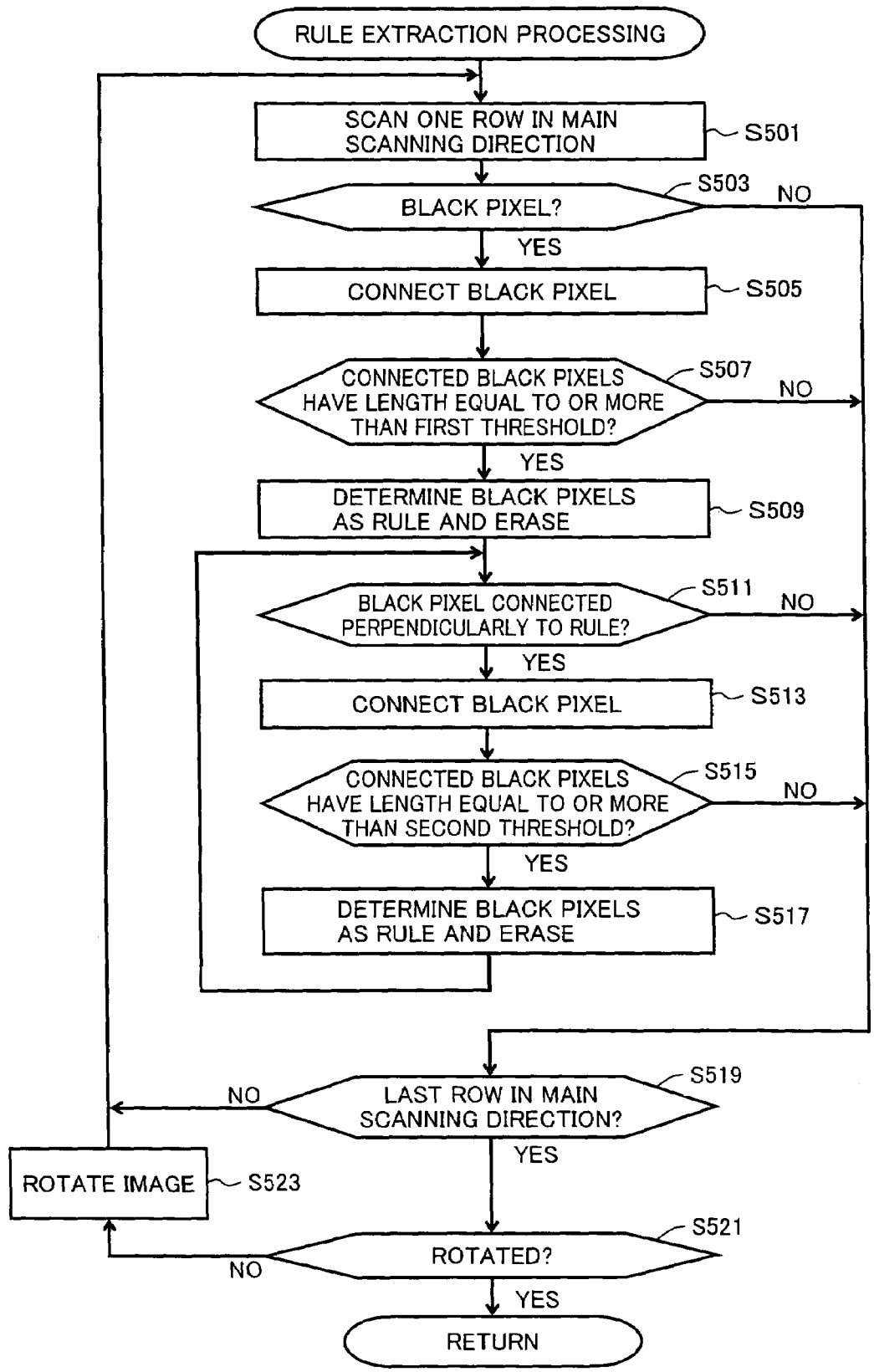
FIG. 8 is a flowchart showing a flow of a first rule extraction processing performed in step S305.

FIG. 8 is a flowchart showing a flow of a first rule extraction processing as the rule extraction processing in step S305. FIGS. 9A to 9E are diagrams specifically illustrating the flow of the first rule extraction processing in the case where the image to be processed is the document image shown in FIG. 18. In FIGS. 9A to 9E, a series of black pixels extracted are shown by a thick line.

Referring to FIG. 8, first, a row in the image to be processed is scanned in a main scanning direction (x direction, for example) as a first scanning direction (step S501). Then, if a series of pixels of a particular color (black pixels, in this example) constituting a rule are detected in the row (YES in step S503), the series of black pixels are combined to form an x-directional line of black pixels (step S505). If the length of the x-directional line of black pixels is equal to or more than a first threshold (if YES in step S507), the x-directional line of black pixels is determined as a rule and erased (step S509).

Note that the first threshold is a value used in typical rule determination. Preferably, the first threshold is greater than the width of a character of a size typically used and, specifically, is a value approximately from 2 to 3 cm.

Through the steps S501 to S509, a rule extending in the main scanning direction in the document image is extracted.

Figure 9A:
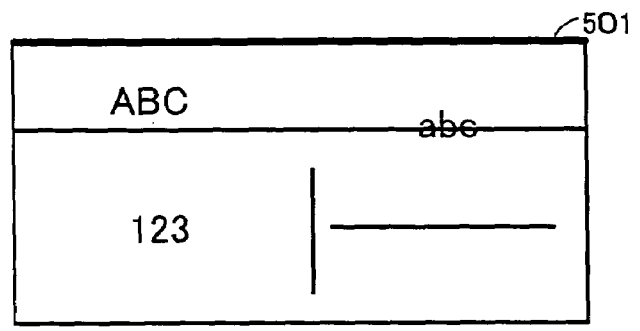
FIGS. 9A to 9E are diagrams for specifically illustrating a flow of the first rule extraction processing.
Figure 18:
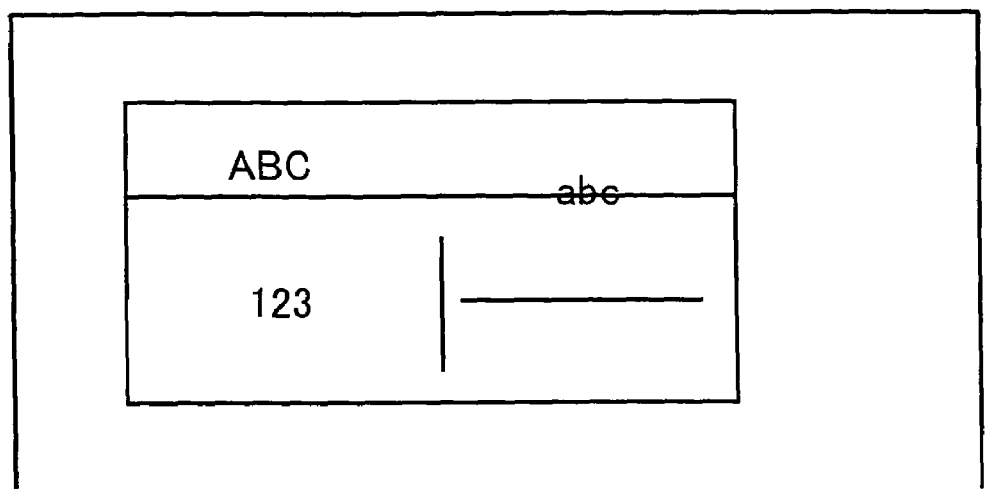
FIG. 18 shows a specific example of a document image.
Figure 19:
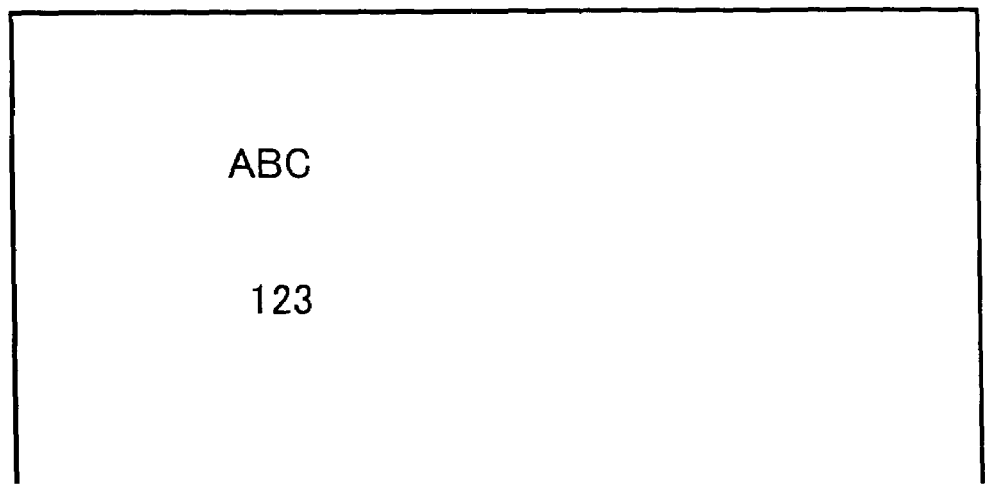
FIG. 19 shows a specific example of a result of character discrimination including no rule extraction.
Figure 20:
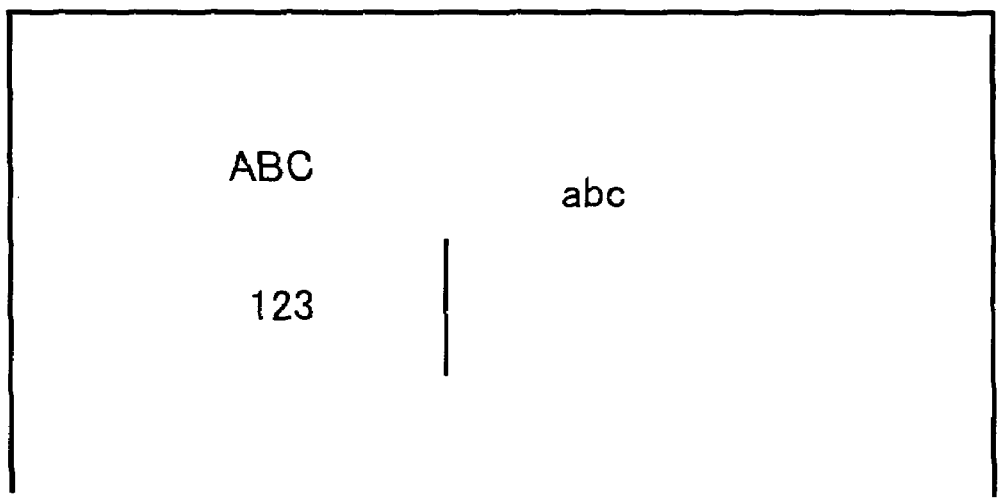
FIG. 20 shows a result of character discrimination including rule extraction.
Figure 21:
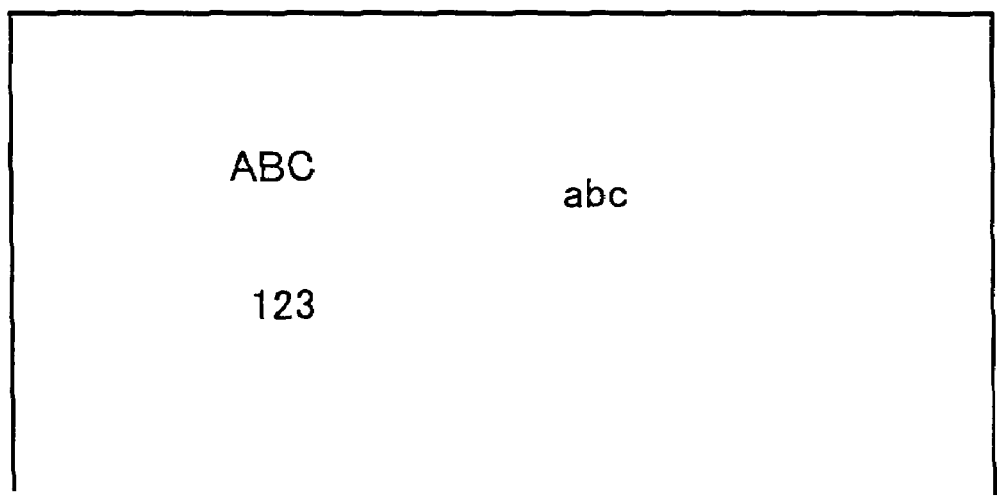
FIG. 21 shows a result of character discrimination including rule extraction.

FIG. 9A shows the result of the processings so far in the case where the image to be processed is the document image shown in FIG. 18. In this drawing, a line 501 is determined as a rule.

Then, the x-directional line of black pixels determined as a rule in step S509 is scanned to check whether or not there is a black pixel that is connected to the x-directional line of black pixels from a sub-scanning direction (y direction, for example) as a second scanning direction. If such a black pixel is detected (YES in step S511), pixels are scanned in the sub-scanning direction around that point to detect black pixels following the black pixel and detected black pixels are combined to form a y-directional line of black pixels (step S513). If the length of the y-directional line of black pixels is equal to or more than a second threshold (YES in step S515), the y-directional line of black pixels is determined as a rule and erased (step S517), and then the process returns to step S511.

Here, the second threshold is smaller than the first threshold and is preferably about 5 mm.

Figure 9B:
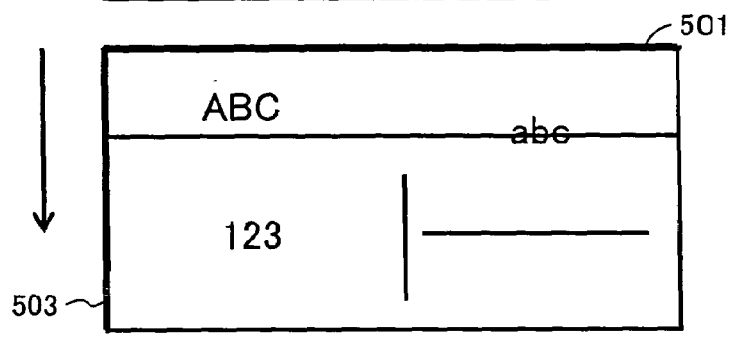

Through the steps S511 to S517, a rule extending in the sub-scanning direction and connected to a rule extending in the main scanning direction in the document image is extracted. FIG. 9B shows the result of the processings so far in the case where the image to be processed is the document image shown in FIG. 18. In this drawing, a line 503, which is a y-directional line connected to the line 501 determined as a rule, is tracked and determined as a rule.

Figure 9C:
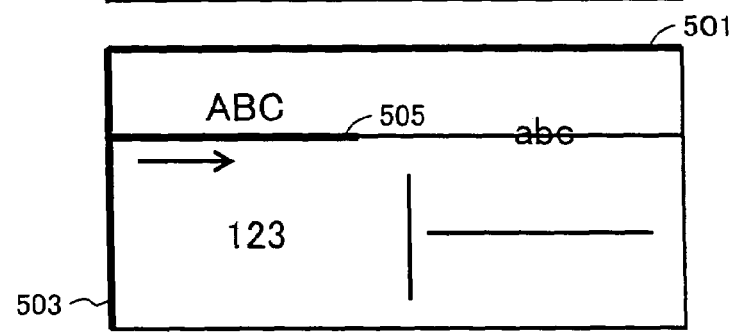

If the x-directional row contains no black pixel, or if the processings described above are completed, and there is no longer any black pixel (NO in step S503), if the length of the x-directional line of black pixels is less than the first threshold (NO in step S507), if there is no black pixel connected to the x-directional line of black pixel from the y direction, or if the processings described above are completed, and all the black pixels connected to the x-directional line of black pixels from the y direction are detected (NO in step S511), or if the length of the y-directional line of black pixels is less than the second threshold (NO in step S515), processing of the row is finished, and the process returns to step S501 to scan the next row. That is, in the case where the image to be processed is the document image shown in FIG. 18, as shown in FIG. 9C, x-directional scanning is repeated to track a line 505, which is the next x-directional line, and determine the line as a rule.

Figure 9D:

The process described above is repeatedly performed for all the rows in the image to be processed. In this regard, any pixel that has been already scanned should not be scanned again. Once the process described above is performed on the document image shown in FIG. 18, lines 501 to 511 shown in FIG. 9D are determined as rules. In the process so far, a line 513 is not determined as a rule because the line 513 is not connected to any x-directional line.

Figure 9E:
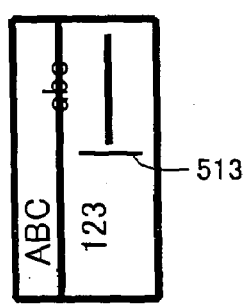

If processing of all the rows in the image to be processed is completed, and the following process is performed for the first time (YES in step S519, and NO in step S521), the image to be processed is rotated 90 degrees to perform the process described above again with the main scanning direction and the sub-scanning direction interchanged (step S523). In this example, the document image shown in FIG. 18 is rotated as shown in FIG. 9E, and the same process as described above is performed on the rotated document image. Then, if the line 513 has a length equal to or more than the first threshold, the line 513 is determined as a rule in step S509 of the process after the image is rotated 90 degrees in step S523.

In the above description of the rule extraction processing, the x direction and the y direction have been described in particular as the first scanning direction and the second scanning direction, respectively. However, the first and second scanning directions may be any other directions. In addition, the directions may be determined taking into account the result of the inclination detection described above.

By the first rule extraction processing described above, series of black pixels having a length equal to or more than the first threshold extending in the main scanning direction or the sub-scanning direction in the document image are determined as rules. In addition, series of black pixels having a length equal to or more than the second threshold, which is smaller than the first threshold, that are perpendicularly connected to the series of black pixels determined as rules are also determined as rules. In this way, in the first rule extraction processing, focusing attention on connection of a rule to another rule, a rule connected perpendicularly to another rule is extracted by changing the threshold for rule determination from the first threshold to the second threshold that is smaller than the first threshold. Thus, if the first rule extraction processing is used, even a short rule can be extracted accurately.

In addition, according to the first rule extraction processing, a series of black pixels having a short length and connected perpendicularly to another rule, that is, a series of black pixels that is probably a rule, is determined as a rule. Thus, if the first rule extraction processing is used, the possibility that a character is determined as a rule by mistake is reduced.

Furthermore, according to the first rule extraction processing, series of black pixels that are probably rules are extracted by changing the threshold depending on the condition as described above. Thus, if the first rule extraction processing is used, the step of extracting a rule using a further threshold from candidates for rules including characters, which is typically found in conventional rule extraction processes, is no longer necessary, so that the processing load can be reduced, and the processing speed can be raised.

[Second Rule Extraction Processing]

Figure 10:
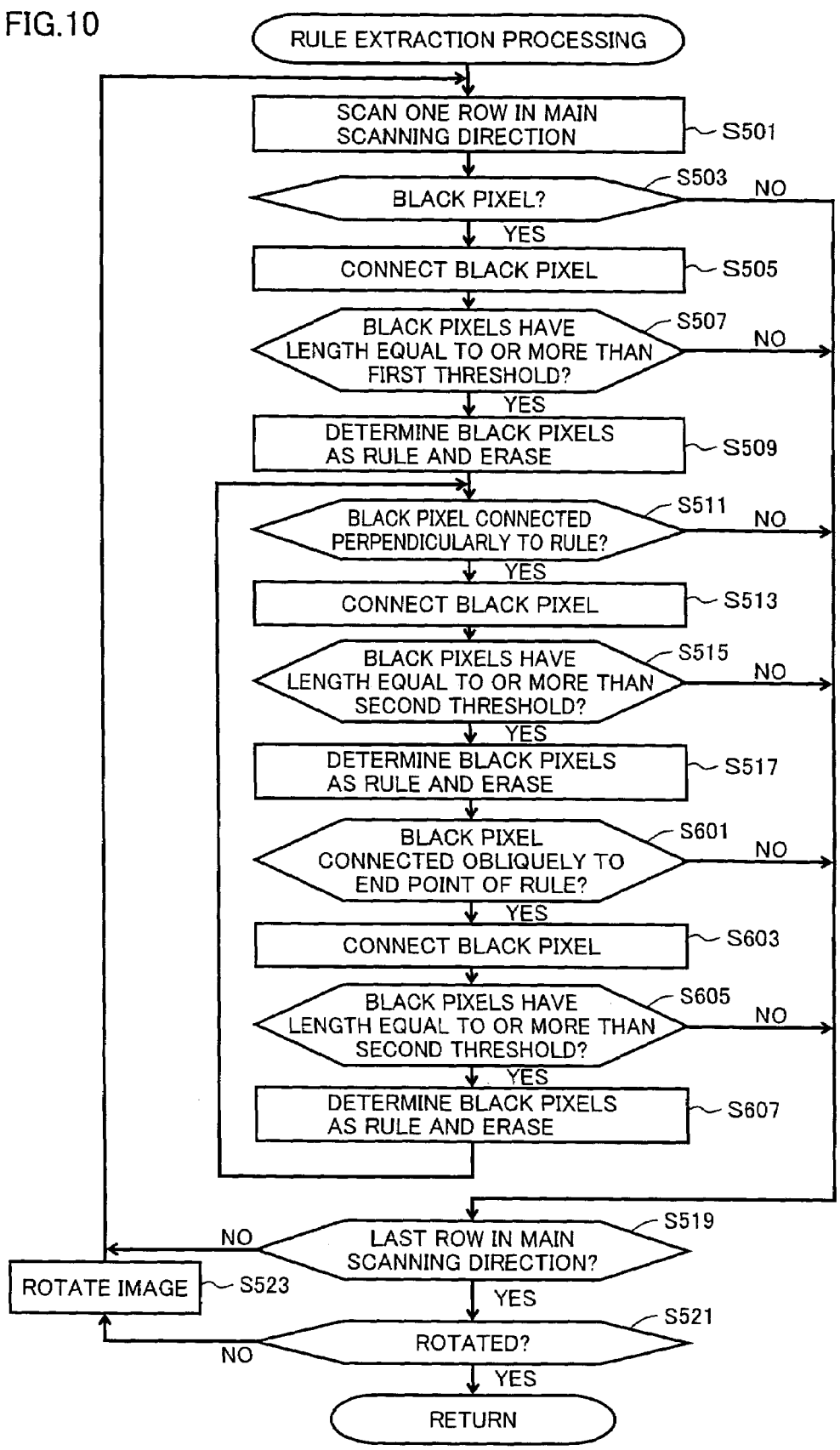
FIG. 10 is a flowchart showing a flow of a second rule extraction processing performed in step S305.
Figure 11A:
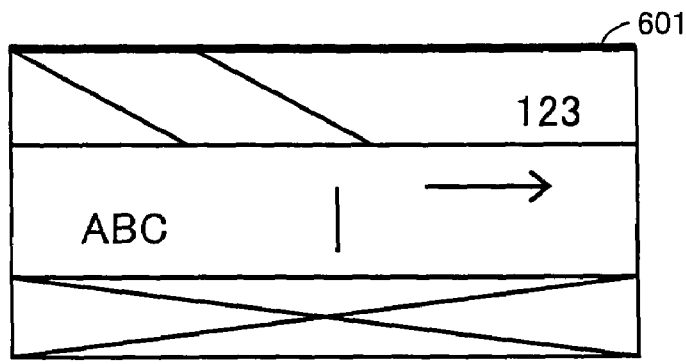
FIGS. 11A to 11C are diagrams for specifically illustrating a flow of the second rule extraction processing.
Figure 11B:
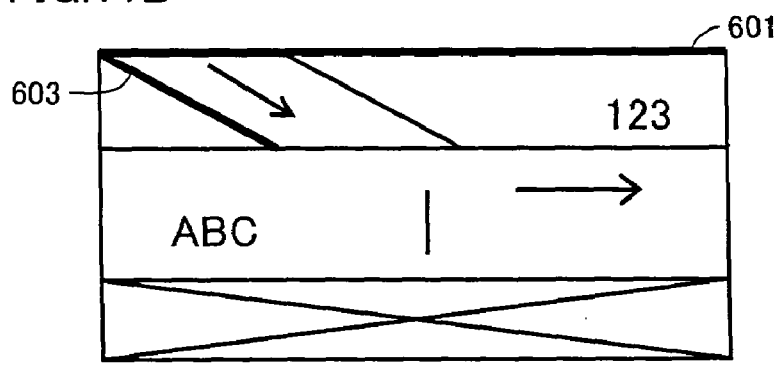
Figure 11C:
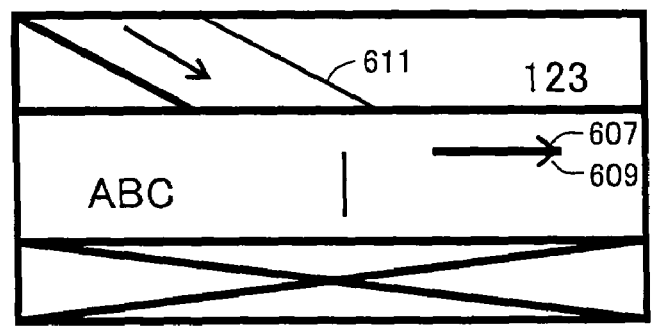

FIG. 10 is a flowchart showing a flow of a second rule extraction processing as the rule extraction processing in step S305. FIGS. 11A to 11C are diagrams specifically illustrating the flow of the second rule extraction processing. The second rule extraction processing is intended to extract an oblique rule based on the fact that "an oblique line connected to an end point of a rule extending in the main scanning direction or the sub-scanning direction is often a rule".

In the second rule extraction processing, steps S601 to S605 are performed in addition to the steps of the first rule extraction processing. More specifically, referring to FIG. 10, after a rule extending in the main scanning direction and a rule extending in the sub scanning direction are extracted through the steps S501 to S517, the x-directional line of black pixels that is determined in step S509 as a rule extending in the main scanning direction is further scanned to search for a black pixel connected obliquely to an end point of the x-directional line. The black pixel searched for in this step can be any black pixel that is connected to the x-directional line of black pixels at an angle. However, more preferably, the black pixel searched for in this step is connected to the x-directional line at an angle equal to or more than 0 degrees and equal to or less than 90 degrees. If such a black pixel is detected (YES in step S601), pixels are scanned in the angular direction around that position to detect black pixels following the black pixel, and detected black pixels are combined to form an oblique line of black pixels (step S603). If the length of the oblique line of black pixels is equal to or more than the second threshold (YES in step S605), the oblique line of black pixels is determined as a rule and erased (step S607), and then the process returns to step S511.

In the case where the document image to be processed is the image shown in FIG. 11A, a line 601 is determined as a rule extending in the main scanning direction through steps S501 to S509, as shown in FIG. 11A, and in step S601, an oblique line 603, which is connected obliquely to an end point of the line 601 determined as a rule, is tracked and determined as a rule, as shown in FIG. 11B.

If there is no black pixel connected obliquely to an end point of the x-directional line of black pixels, or if there is no black pixel connected obliquely to the other end point of the x-directional line of black pixels (NO in step S601), or if the length of the oblique line of black pixels is less than the second threshold (NO in step S605), processing of the row is finished, and the process returns to step S501 to scan the next row. Furthermore, if processing of all the rows in the image to be processed is completed (YES in step S519), the image to be processed is rotated 90 degrees to performs the same process as described above again, as with the first rule extraction processing (step S523).

By the second rule extraction processing described above, a series of black pixels having a length equal to or more than the second threshold connected obliquely to an end point of a rule extending in the main scanning direction or the sub-scanning direction in the document image is determined as an oblique rule. Thus, if the second rule extraction processing is used, an oblique rule can be extracted with less errors.

[Third Rule Extraction Processing]

Figure 12:
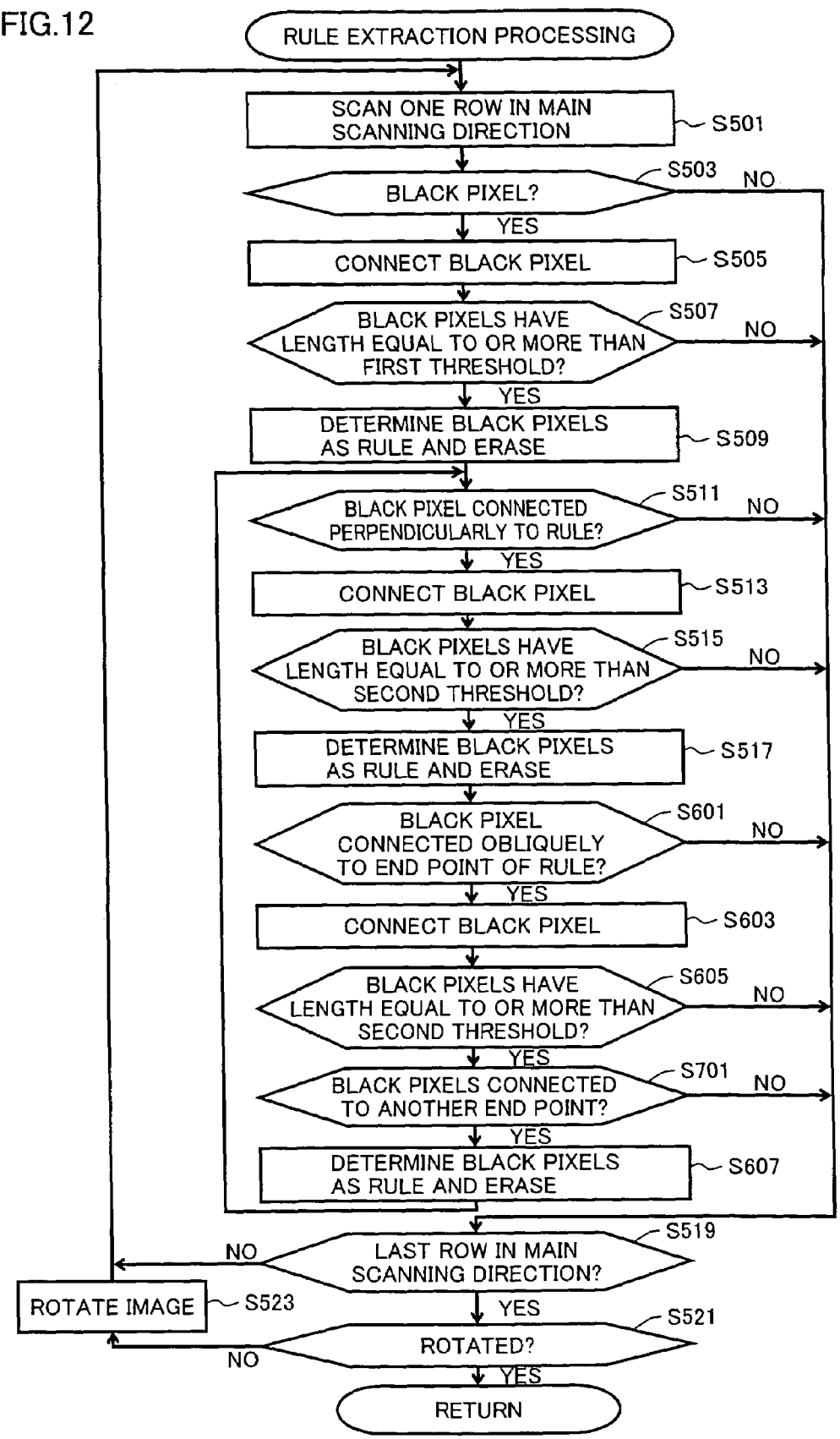
FIG. 12 is a flowchart showing a flow of a third rule extraction processing performed in step S305.
Figure 13:
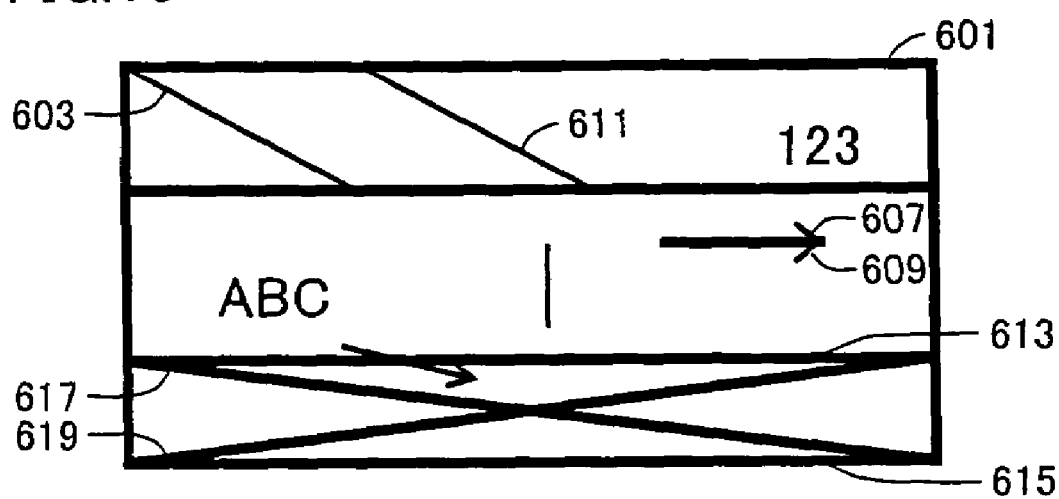
FIG. 13 is a diagram for specifically illustrating a flow of the third rule extraction processing.

FIG. 12 is a flowchart showing a flow of a third rule extraction processing as the rule extraction processing in step S305. FIG. 13 is a diagram specifically illustrating the flow of the third rule extraction processing. The third rule extraction processing is intended to extract an oblique rule based on the fact that "a line connecting the opposite angles of a table frame is often an oblique rule".

In the third rule extraction processing, step S701 is performed in addition to the steps of the second rule extraction processing. More specifically, referring to FIG. 12, after a rule extending in the main scanning direction and a rule extending in the sub scanning direction are extracted, and an oblique line of black pixels having a length equal to or more than the second threshold that is connected to the x-directional line of black pixels are extracted through the steps S501 to S605, the oblique line of black pixels is tracked. Then, if the oblique line is connected to an end point of another rule (YES in step S701), the oblique line of black pixels is determined as a rule and erased (step S607), and the process returns to step S511.

Alternatively, in step S607, an oblique line of black pixels may be determined as a rule when the oblique line is connected to an intersection of rules, rather than connected to an end point of another rule.

In the case where the document image to be processed is the image shown in FIG. 11A, the oblique line 603 determined as an oblique rule in the second rule extraction processing is not extracted as a rule in the third rule extraction processing, and two oblique lines 617 and 619 connected obliquely to end points of lines 613 and 615 determined as rules are each tracked and determined as rules. In addition, in the third rule extraction processing, lines 607, 609 and 611 are not determined as rules, because the lines are not connected to an end point of a line determined as a rule at either or both of the ends thereof.

By the third rule extraction processing described above, a series of black pixels having a length equal to or more than the second threshold connected obliquely to an end point of a rule extending in the main scanning direction and/or a rule extending in the sub-scanning direction and an end point of another rule in the document image, that is, a line connecting the opposite angles of a table frame or the like in the document image is determined as an oblique rule. Thus, if the third rule extraction processing is used, an oblique rule can be extracted more accurately.

[Fourth Rule Extraction Processing]

Figure 14:
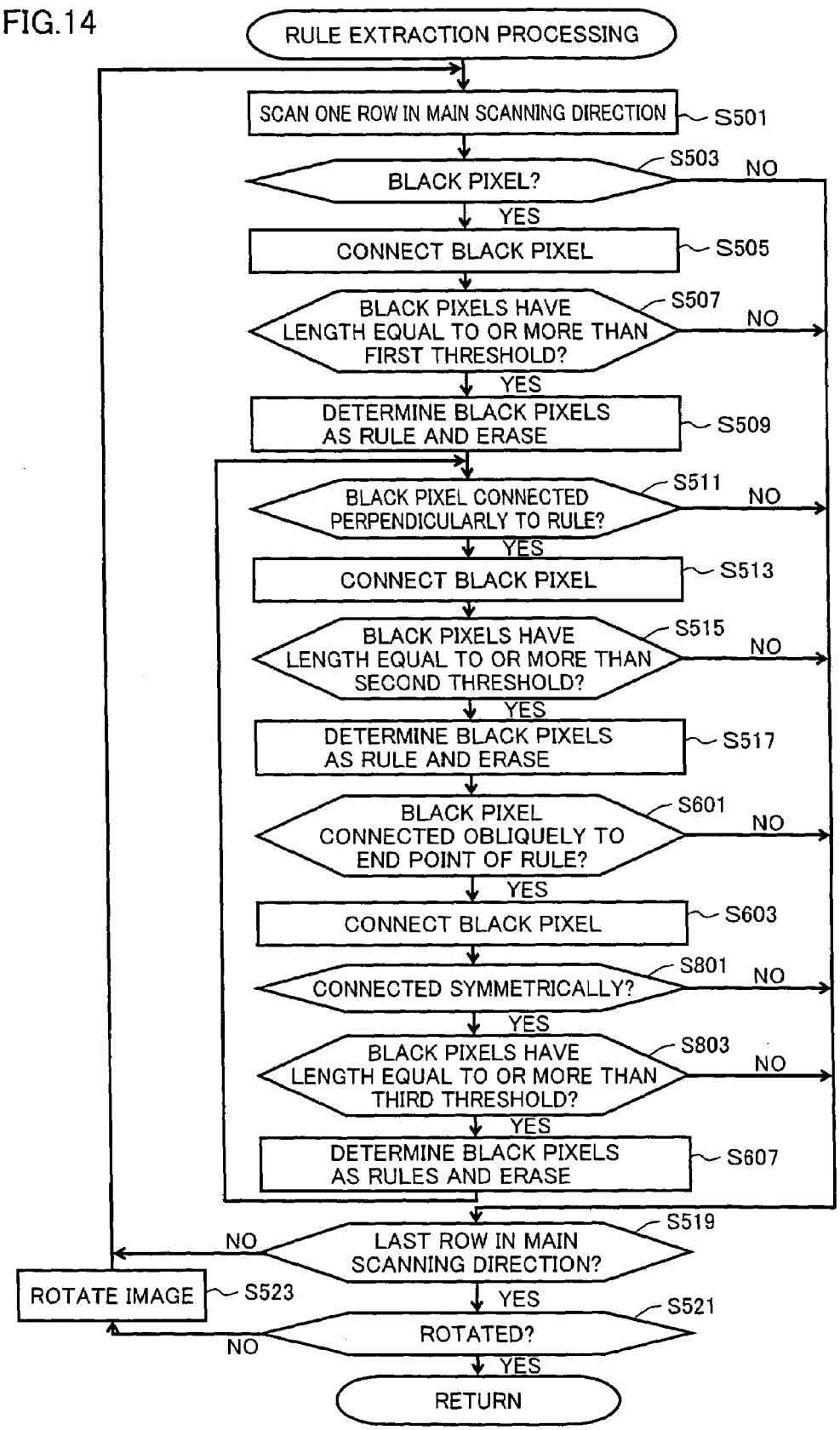
FIG. 14 is a flowchart showing a flow of a fourth rule extraction processing performed in step S305.
Figure 15A:
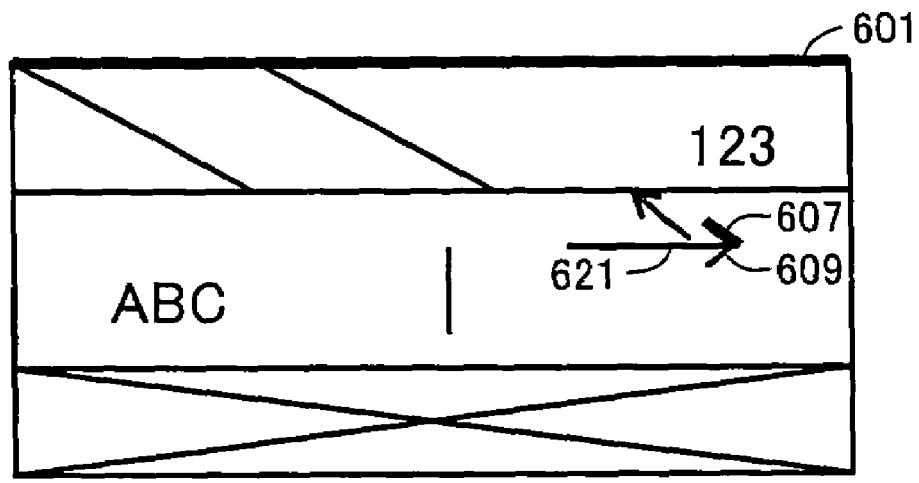
FIGS. 15A to 15B are diagrams for specifically illustrating a flow of the fourth rule extraction processing.
Figure 15B:
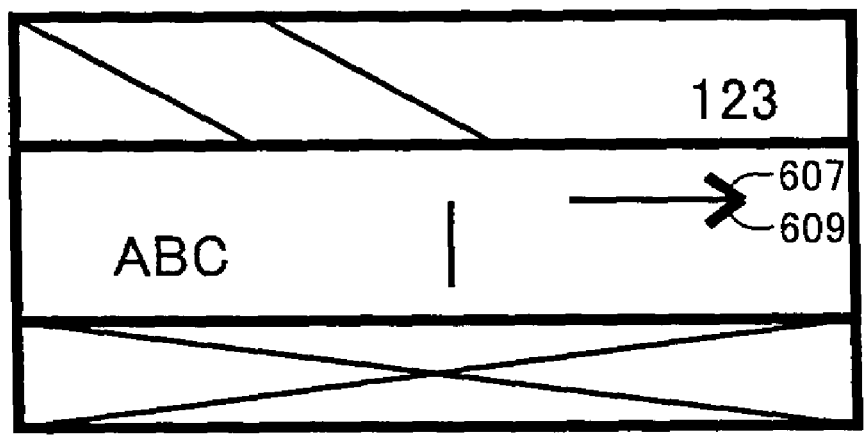

FIG. 14 is a flowchart showing a flow of a fourth rule extraction processing as the rule extraction processing in step S305. FIGS. 15A and 15B are diagrams specifically illustrating the flow of the fourth rule extraction processing. The fourth rule extraction processing is intended to extract oblique rules that form the tip of an arrow based on the fact that "two oblique lines at the tip of an arrow extends symmetrically with respect to the center line of the arrow".

In the fourth rule extraction processing, steps S801 and S803 are performed in addition to the steps of the second rule extraction processing. More specifically, referring to FIG. 14, after a rule extending in the main scanning direction and a rule extending in the sub scanning direction are extracted, and an oblique line of black pixels connected to the x-directional line of black pixels is extracted through the steps S501 to S603, if it is detected that the oblique line is connected to the x-directional line symmetrically to another oblique line connected to the x-directional line at the same position (YES in step S801), the oblique lines are tracked. Then, if both the lines have an equal length that is equal to or more than a third threshold (YES in step S803), the oblique lines of black pixels are determined as rules and erased (step S607), and the process returns to step S511.

Note that the third threshold may be approximately equal to the second threshold. However, the third threshold is preferably smaller than the second threshold. Specifically, the third threshold is preferably about 3 mm.

In the case where the document image to be processed is the image shown in FIG. 11A, as shown in FIG. 15A, if an oblique line 607 is connected to a line 621 determined as a rule, and it is detected that the line 607 is connected symmetrically, with respect to the line 621, to another oblique line 609 connected to the line 621 at the same position, the line 607 is tracked. In addition, the line 609 is also tracked, and the oblique lines 607 and 609 are determined as rules as shown in FIG. 15B.

By the fourth rule extraction processing described above, two series of black pixels having a length equal to or more than the third threshold that are connected symmetrically at equal angles to an end point of a rule extending in the main scanning direction or the sub-scanning direction in the document image are determined as oblique rules. Thus, if the fourth rule extraction processing is used, oblique rules at the tip of an arrow can be extracted accurately even if the oblique lines are short.

The rule extraction processing according to this embodiment is not limited to the first to fourth rule extraction processing described above, and another processing may be used, or two or more of the processings described above may be used in combination.

In the above description, in the second to fourth rule extraction processings, it has been supposed that an oblique rule is extracted after a rule extending in the main scanning direction and a rule extending in the sub-scanning direction are extracted through the steps S501 to S517 of the first rule extraction processing. However, steps S511 to S517 may be skipped after a rule extending in the main scanning direction is extracted through steps S501 to S509, and an oblique line may be extracted without extracting a rule extending in the sub-scanning direction.

Furthermore, the rule extraction method used in the rule extraction processing performed when the MFP 10 creates a PDF file by compressing image data may be provided as a program. Such a program can be stored in a computer-readable recording medium, such as a flexible disk attached to a computer, a compact disk read only memory (CD-ROM), a read only memory (ROM), a random access memory (RAM) and a memory card, and provided as a program product. Alternatively, the program can be recorded in a recording medium, such as a hard disk incorporated in a computer. Alternatively, the program can be provided by download through a network.

The rule extraction program according to the present invention may invoke required ones of program modules provided as part of the operation system (OS) of a computer at a predetermined sequence at a predetermined timing to make the modules execute the processing. In this case, the program itself does not contain the modules described above and cooperates with the OS to execute the processing. Such a program that contains no modules is included in the rule extraction program according to the present invention.

The program product provided is installed in a program storage unit, such as a hard disk, for execution. Here, it is to be noted that the program product includes a program itself and a storage medium in which the program is recorded.

Figure 16:
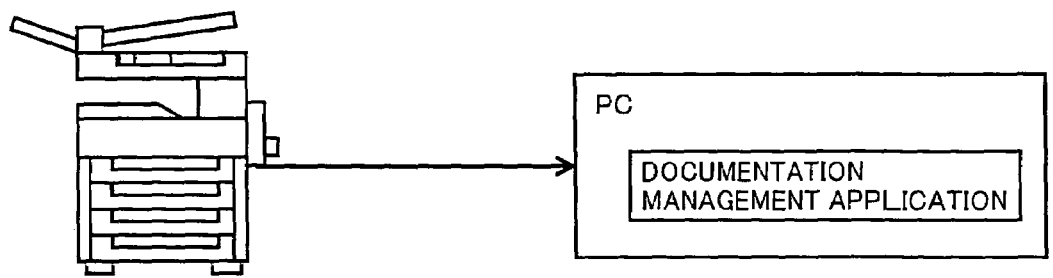
FIG. 16 shows a first configuration of a system for creating a PDF file using a rule extraction program.

Referring to FIG. 16, a system of a first configuration for creating a PDF file using the program described above includes an image acquisition device, such as an MFP, and a personal computer (abbreviated as PC, hereinafter) having a documentation management application implemented by the program described above installed therein which are connected to each other via a cable or wireless network. In the system of the first configuration, according to the documentation management application, the PC performs a PDF file creation processing including the rule extraction processing described above, thereby creating a PDF file from image data received from the MFP in the form of an attachment to an e-mail or the like. In the case the program described above is used in the system of the first configuration, a user operating the PC can select desired image data for PDF formatting from among image data transmitted from the MFP.

Figure 17:
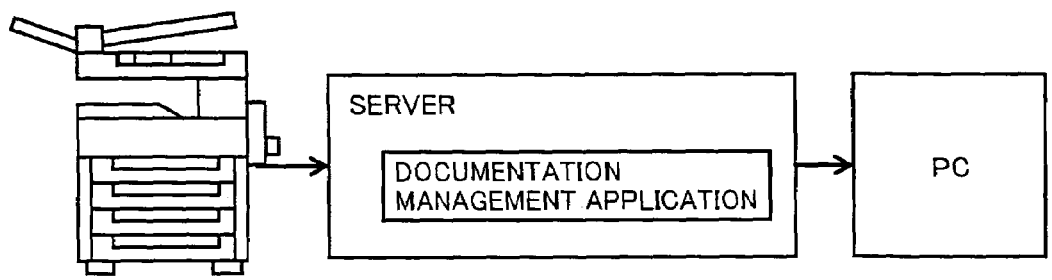
FIG. 17 shows a second configuration of a system for creating a PDF file using a rule extraction program.

Referring to FIG. 17, a system of a second configuration for creating a PDF file using the program described above includes an image acquisition device, such as an MFP, and a PC which are connected to each other by a cable or wireless network via a server, such as a mail server, that has a documentation management application implemented by the program described above installed therein. In the system of the second configuration, according to the documentation management application, the server performs a PDF file creation processing including the rule extraction processing described above, thereby creating a PDF file from image data obtained from the MFP. Then, the server transmits the PDF-formatted image data to the PC. In the case the program described above is used in the system of the second configuration, a user operating the PC connected to the server can obtain image data that has been PDF-formatted and reduced in size from the server.

The first and second configurations are only specific examples of the configuration in which the rule extraction program according to the present invention and/or a program including the rule extraction program are used, and other configurations may be used.

According to this embodiment, the present invention is used for the rule extraction processing that is an image processing preceding creation of a PDF file. However, the present invention is not limited thereto but can be used for a rule extraction and erasing processing for preventing erroneous character recognition that is performed before character recognition performed by an optical character reader (OCR) or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
an image data obtaining unit for obtaining image data; and
a rule extracting unit for extracting a rule from said image data,
wherein said rule extracting unit includes:
a first determining unit for scanning said image data in a first direction and, if a first series of pixels having a length equal to or more than a first threshold is detected, determining said first series of pixels as a first rule; and
a second determining unit for scanning said image data from said first rule in a second direction and, if a second series of pixels having a length equal to or more than a second threshold connected to said first rule is detected, determining said second series of pixels as a second rule, and
said second threshold is smaller than said first threshold.

2. The image processing apparatus according to claim 1, wherein said first direction and said second direction are perpendicular to each other.

3. The image processing apparatus according to claim 1, wherein said first direction and said second direction are at an angle that is equal to or more than 0 degrees and less than 90 degrees, and
said second determining unit determines said second series of pixels as the second rule when said second series of pixels is connected to an end point of said first rule.

4. The image processing apparatus according to claim 1, wherein said first direction and said second direction are at an angle that is equal to or more than 0 degrees and less than 90 degrees, and
said second determining unit determines said second series of pixels as the second rule when said second series of pixels is connected to an end point of said first rule and an end point of a third rule.

5. The image processing apparatus according to claim 1, wherein said first direction and said second direction are at an angle that is equal to or more than 0 degrees and less than 90 degrees, and
said second determining unit determines said second series of pixels as the second rule when said second series of pixels is consisted of a third series of pixels and a fourth series of pixels that are connected to one end point of said first rule axisymmetrically with respect to said first rule.

6. The image processing apparatus according to claim 1, wherein said rule extracting unit further includes a third determining unit for scanning from said first rule in a third direction, and if a third series of pixels and a fourth series of pixels having a length equal to or more than a third threshold connected to one end point of said first rule axisymmetrically with respect to said first rule are detected, determining said third series of pixels and said fourth series of pixels as a third rule and a fourth rule, respectively, and said third threshold is smaller than said second threshold.

7. The image processing apparatus according to claim 1, further comprising an erasing unit for erasing a series of pixels that is determined as a rule by said rule extracting unit.

8. The image processing apparatus according to claim 1, further comprising a character determining unit for performing a character determination processing on an area in said image data excluding a series of pixels that is determined as a rule by said rule extracting unit.

9. The image processing apparatus according to claim 1, wherein said first determining unit determines said first series of pixels as the first rule if said first series of pixels composed of pixels consisted of a particular color is detected.

10. An image processing apparatus, comprising:
an image data obtaining unit for obtaining image data; and
a rule extracting unit for extracting a rule from said image data,
wherein said rule extracting unit includes:
a first determining unit for scanning said image data in a first direction and, if a first series of pixels having a length equal to or more than a first threshold is detected, determining said first series of pixels as a first rule; and
a second determining unit for scanning said image data in a second direction which is at an angle equal to or more than 0 degrees and less than 90 degrees with respect to said first direction and, if a second series of pixels having a length equal to or more than a second threshold connected to said first rule is detected, determining said second series of pixels as a second rule.

11. The image processing apparatus according to claim 10, wherein said second threshold is smaller than said first threshold.

12. The image processing apparatus according to claim 10, wherein said second determining unit determines said second series of pixels as the second rule when said second series of pixels is connected to an end point of said first rule.

13. The image processing apparatus according to claim 10, wherein said second determining unit determines said second series of pixels as the second rule when said second series of pixels is connected to an end point of said first rule and an end point of a third rule.

14. The image processing apparatus according to claim 10, wherein said second determining unit determines said second series of pixels as the second rule when said second series of pixels is consisted of a third series of pixels and a fourth series of pixels that are connected to one end point of said first rule axisymmetrically with respect to said first rule.

15. A rule extracting program stored in a computer-readable recording medium causing a computer to perform rule extraction processing in an image processing apparatus, said rule extraction processing comprising:
an image data obtaining step of obtaining image data;
a first extraction step of scanning said image data in a first direction and, if a first series of pixels having a length equal to or more than a first threshold is detected, determining said first series of pixels as a first rule and extracting said first series of pixels; and
a second extraction step of scanning said image data from said first rule in a second direction and, if a second series of pixels having a length equal to or more than a second threshold connected to said first rule is detected, determining said second series of pixels as a second rule and extracting said second series of pixels, said second threshold being smaller than said first threshold.

16. The rule extracting program according to claim 15, wherein said first direction and said second direction are perpendicular to each other.

17. The rule extracting program according to claim 15, wherein said first direction and said second direction are at an angle that is equal to or more than 0 degrees and less than 90 degrees, and
in said second extraction step, when said second series of pixels is connected to an end point of said first rule, said second series of pixels is determined as the second rule and extracted.

18. The rule extracting program according to claim 15, wherein said first direction and said second direction are at an angle that is equal to or more than 0 degrees and less than 90 degrees, and
in said second extraction step, when said second series of pixels is connected to an end point of said first rule and an end point of a third rule, said second series of pixels is determined as the second rule and extracted.

19. The rule extracting program according to claim 15, wherein said first direction and said second direction are at an angle that is equal to or more than 0 degrees and less than 90 degrees, and
in said second extraction step, when said second series of pixels is consisted of a third series of pixels and a fourth series of pixels that are connected to one end point of said first rule axisymmetrically with respect to said first rule, said second series of pixels is determined as the second rule and extracted.

20. The rule extracting program according to claim 15, wherein said rule extraction process further comprises a third extraction step of scanning from said first rule in a third direction, and if a third series of pixels and a fourth series of pixels having a length equal to or more than a third threshold connected to one end point of said first rule axisymmetrically with respect to said first rule are detected, determining said third series of pixels and said fourth series of pixels as a third rule and a fourth rule, respectively, and extracting said third series of pixels and said fourth series of pixels, and
said third threshold is smaller than said second threshold.

* * * * *

UNITED STATES PATENT AND TRADEMARK OFFICE
CERTIFICATE OF CORRECTION

PATENT NO. : 7,660,014 B2
APPLICATION NO. : 11/447050
DATED : February 9, 2010
INVENTOR(S) : Kazuya Yago It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 901 days.

Signed and Sealed this

Twenty-eighth Day of December, 2010

David J. Kappos
*Director of the United States Patent and Trademark Office*